United States Patent
Uebele et al.

[11] 3,954,913
[45] May 4, 1976

[54] STABILIZED NITRILE POLYMERS

[75] Inventors: Curtis E. Uebele, Bedford; Eddie Wardlow, Jr., Cleveland, both of Ohio

[73] Assignee: The Standard Oil Company, Cleveland, Ohio

[22] Filed: Jan. 6, 1975

[21] Appl. No.: 538,569

[52] U.S. Cl. ............ 260/880 R; 260/45.8 A; 260/45.8 N; 260/45.8 NZ; 260/45.85 V; 260/893

[51] Int. Cl.² ............ C08K 5/12; C08K 5/15; C08K 5/34

[58] Field of Search ......... 260/45.8 A, 45.8 N, 260/45.8 NZ, 45.85 V, 880 R

[56] References Cited
UNITED STATES PATENTS

| | | | |
|---|---|---|---|
| 2,449,959 | 9/1948 | Staudinger et al. | 260/31.8 |
| 2,558,701 | 6/1951 | Corbett et al. | 260/45.8 |
| 2,617,784 | 11/1952 | Slocombe et al. | 260/45.7 |
| 2,661,347 | 12/1953 | Wesp et al. | 260/45.85 |
| 2,868,745 | 1/1959 | Canarios | 260/23 |
| 3,252,936 | 5/1966 | Richart | 260/45.8 |
| 3,520,847 | 7/1970 | Runge et al. | 260/45.8 |
| 3,539,524 | 11/1970 | Wilkinson | 260/32.6 |
| 3,793,401 | 2/1974 | Nield et al. | 260/876 |

*Primary Examiner*—Donald E. Czaja
*Assistant Examiner*—R. A. White
*Attorney, Agent, or Firm*—John F. Jones; Sherman J. Kemmer; Evelyn R. Kosman

[57] ABSTRACT

Nitrile copolymers and graft copolymers containing a high proportionate amount of olefinic nitrile are stabilized against thermal color degradation by inclusion into the polymer minor amounts of a compound having the formula:

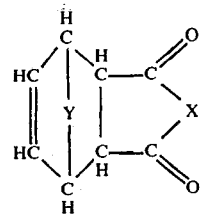

and/or

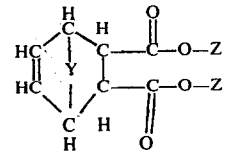

wherein X may be oxygen; an imide group, —NH—; or an N-substituted imide group, —NR— wherein R may be an alkyl, or a phenyl alkyl group containing from 1 to 8 carbon atoms; Y may be an oxygen or a methylene group; and Z may be hydrogen or an alkyl group containing from 1 to 8 carbon atoms.

11 Claims, No Drawings

STABILIZED NITRILE POLYMERS

The present invention relates to a nitrile resin composition and to a method for stabilizing nitrile resins against discoloration generated by thermal degradation during fabrication and processing. More particularly this invention relates to the stabilization of copolymers and graft copolymers containing a high proportionate amount of olefinic nitrile against thermal discoloration by inclusion into the polymer minor amounts of a compound having the formula:

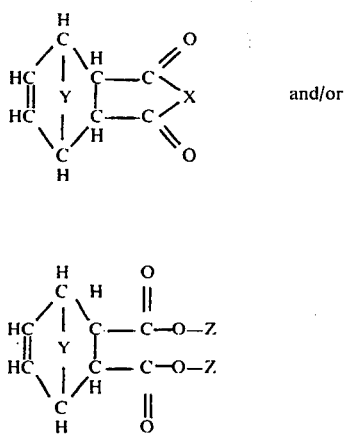 and/or wherein X may be oxygen; an imide group, —NH—; or an N-substituted imide group, —NR— wherein R may be an alkyl, or a phenyl alkyl group containing from 1 to 8 carbon atoms; Y may be an oxygen or a methylene group; and Z may be hydrogen or an alkyl group containing from 1 to 12 carbon atoms.

The stabilizers of this invention are compatible with the nitrile resins, they do not impart any additional haze or reduce light transmission of the resin, nor do they have any adverse effect on the physical properties of the resins within the concentration ranges specified. Their effectiveness for copolymers and rubber-modified copolymers of acrylonitrile is surprising in view of the disclosure in U.S. Pat. No. 3,793,401 which teaches that cyclic anhydrides of acyclic unsaturated α,β-dicarboxylic acids do not provide any substantial stabilization for copolymers and rubber-modified copolymers of acrylonitrile.

The stabilizing compounds of this invention are effective at very low concentrations, and they may be advantageously incorporated into the nitrile resins in concentrations ranging from about 0.05 to about 2 parts per hundred parts of resin, on a weight basis, and preferably in concentrations ranging from about 0.1 to about 1 part by weight per hundred parts of the final resin. With higher concentrations than about 1 part phr, however, the efficiency of the stabilizer diminishes rapidly and the economics become increasingly less attractive.

Compounds which are particularly effective as stabilizers for the acrylonitrile copolymers of the present invention include: 7-oxabicyclo[2.2.1]5-heptene-2,3-dicarboxylic anhydride; 7-oxabicyclo[2.2.1]5-heptene-2,3-dicarboxylic acid; 5-norbornene-2,3-dicarboxylic anhydride; 7-oxabicyclo [2.2.1]5-heptene-2,3-dicarboximide; N-phenyl-7-oxabicyclo [2.2.1]5-heptene-2,3-dicarboximide; mono-dodecylester of 7-oxabicyclo[2.2.1]5-heptene-2,3-dicarboxylic acid; and the like.

The stabilizers of the present invention may be incorporated into the polymeric material at any convenient time during the polymerization reaction or after the polymerization reaction has been completed. For example, the stabilizers may be satisfactorily incorporated into a latex of the nitrile resin previous to the coagulation and subsequent processing by conventional techniques, or the stabilizer may be conveniently incorporated by dry blending with resin strands or powders, and the resulting blends can be pelletized and/or extruded into sheets or other shapes. It is also contemplated to be within the scope of the present invention to employ a concentrate of the stabilizer in the polymerization mixture, as for example, a 20% concentration of the stabilizer in an acrylonitrile-styrene monomer mixture.

The nitrile polymers useful in this invention include those resinous polymers and interpolymers produced by polymerizing a major proportion of a mono-unsaturated nitrile, such as acrylonitrile, and a minor proportion of another monovinyl monomer component copolymerizable with said nitrile in an aqueous or an organic medium and optionally in the presence of a preformed diene rubber which may be a homopolymer or a copolymer of a conjugated diene monomer.

The conjugated diene monomers useful in the present invention include butadiene-1,3, isoprene, chloroprene, bromoprene, cyanoprene, 2,3-dimethylbutadiene-1,3, 2-ethyl-butadiene-1,3, 2,3-diethyl butadiene-1,3, and the like, and others. Most preferred for the purpose of this invention are butadiene and isoprene because of their ready availability and their excellent copolymerization properties.

The olefinically unsaturated nitriles useful in the present invention are the alpha,beta-olefinically unsaturated mononitriles having the structure

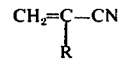

wherein R is hydrogen, a lower alkyl group having from 1 to 4 carbon atoms, or a halogen. Such compounds include acrylonitrile, alpha-chloroacrylonitrile, alpha-fluoroacrylonitrile, methacrylonitrile, ethacrylonitrile, and the like. The most preferred olefinically unsaturated nitriles in the present invention are acrylonitrile and methacrylonitrile and mixtures thereof.

The other monovinyl monomer component copolymerizable with the olefinically unsaturated nitriles which are useful in this invention includes one or more of the esters of olefinically unsaturated carboxylic acids, vinyl esters, vinyl ethers, alphi-olefins, vinyl aromatic monomers, and other.

The esters of olefinically unsaturated carboxylic acids include those having the structure

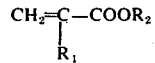

wherein $R_1$ is hydrogen, an alkyl group having from 1 to 4 carbon atoms, or a halogen, and $R_2$ is an alkyl group having from 1 to 6 carbon atoms. Compounds of this type include methyl acrylate, ethyl acrylate, the propyl acrylates, the butyl acrylates, the amyl acrylates, and the hexyl acrylates; methyl methacrylate, ethyl methacrylate, the propyl methacrylates, the butyl methacrylates, the amyl methacrylates, and the hexyl methacrylates; methyl alpha-chloroacrylate, ethyl alpha-chloroacrylate, and the like. Most preferred in the present invention are methyl acrylate, ethyl acrylate, methyl methacrylate, and ethyl methacrylate.

The alpha-olefins useful in the present invention are those having at least 4 and as many as 10 carbon atoms and having the structure

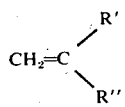

wherein R' and R'' are alkyl groups having from 1 to 7 carbon atoms, and more specifically preferred are alpha-olefins such as isobutylene, 2-methyl butene-1, 2-methyl pentene-1, 2-methyl hexene-1, 2-methyl heptene-1, 2-methyl octene-1, 2-ethyl butene-1, 2-propyl pentene-1, and the like. Most preferred is isobutylene.

The vinyl ethers include methyl vinyl ether, ethyl vinyl ether, the propyl vinyl ethers, the butyl vinyl ethers, methyl isopropenyl ether, ethyl isopropenyl ether, and the like. Most preferred are methyl vinyl ether, ethyl vinyl ether, the propyl vinyl ethers, and the butyl vinyl ethers.

The vinyl esters include vinyl acetate, vinyl propionate, the vinyl butyrates, and the like. Most preferred is vinyl acetate.

The vinyl aromatic monomers include styrene, alpha-methyl styrene, the vinyl toluene, the vinyl xylenes, isopropyl styrene such as o—, m— and p-isopropyl styrene and the like and mixtures of the same. Most preferred is styrene.

Some of the polymerizates of particular utility in this invention and details of their method of preparation are described in U.S. Pat. Nos. 3,426,102, 3,586,737 and 3,763,278.

The polymerizates useful in the process of this invention are those prepared by the polymerization of 100 parts by weight of (A) at least 50% by weight of at least one nitrile having the structure

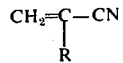

wherein R has the foregoing designation and (B) up to 50% by weight based on the combined weight of (A) and (B) of at least one member selected from the group consisting of (1) an ester having the structure

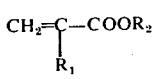

wherein $R_1$ and $R_2$ have the foregoing respective designations, (2) an alpha-olefin having the structure

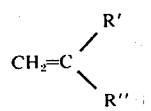

wherein R' and R'' have the foregoing respective designations, (3) a vinyl ether selected from the group consisting of methyl vinyl ether, ethyl vinyl ether, ahe propyl vinyl ethers, and the butyl vinyl ethers, (4) vinyl acetate, and (5) styrene, in the presence of from 0 to 40 parts by weight of (C) a rubbery polymer of a conjugated diene monomer selected from the group consisting of butadiene and isoprene and optionally a comonomer selected from the group consisting of styrene and a nitrile monomer having the structure

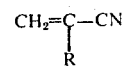

wherein R has the foregoing designation, said rubbery polymer containing from 50 to 100% by weight of polymerized conjugated diene and from 0 to 50% by weight of comonomer.

Preferably, component (A) should be present in amounts of from about 70 to 90% by weight based on the combined weight of (A) and (B) and the rubbery polymer (C) should contain more than 50% by weight of conjugated diene and more preferably from 60 to 90% by weight of the conjugated diene.

The polymeric compositions of the present invention can be prepared by any of the known general techniques of polymerization including the bulk polymerization, solution polymerization and emulsion or suspension polymerization techniques, by batch, continuous or intermittent addition of the monomers and other components. The polymerization is preferably carried out in aqueous emulsion or suspension processes in the presence of an emulsifier, molecular weight modifier and a free-radical generating polymerization initiator at a temperature of from about 0° to 100°C in the substantial absence of molecular oxygen. It is also preferred that the monomers are copolymerized in the presence of an emulsion or a suspension of the preformed rubber. The product of the aqueous emulsion polymerization is usually a latex. The copolymers may be recovered from the latex by any suitable means such as by coagulation with electrolytes or solvents, by freezing, and the like.

The polymerizates useful in the process of this invention can contain compounding ingredients and additives, pigments, colorants, stabilizers, fillers, etc., as is well known in the art so long as the balance between impact strength, flexural strength, tensile strength, processability, heat distortion temperature, and the like is not affected to such a degree that the article is no longer useful for its intended purpose.

Polymeric products of the present invention are thermoplastic materials which can be thermoformed into a wide variety of useful articles in any of the conventional ways employed with known thermoplastic polymeric materials, such as by extrusion, milling, molding, drawing, blowing, and the like. These polymers have excellent solvent resistance and their impact strength and low permeability to gases and vapors make them very useful in the packaging industry, and they are particularly useful in the manufacture of bottles, film, and other types of containers for liquids and solids.

The following examples illustrate in greater detail the preferred mode of carrying out the present invention, and the amounts of ingredients in these examples are given in parts by weight unless otherwise indicated. It is to be understood, however, that the scope of this invention is not to be limited by these examples.

Example A

Preparation of Acrylonitrile-Styrene Copolymers

| Components | Parts by Weight |
| --- | --- |
| Water | 225 |
| Acrylonitrile | 77 |
| Styrene | 23 |
| GAFAC RE-610[1] (emulsifier) | 1.35 |
| Pentaerythritol tetrakis mercaptopropionate (Carlisle Q-43 | 1.65 |
| 2,2'-Azo-bis (isobutyronitrile) (Vazo 64) | 0.16 |
| Butylates hydroxytoluene (Naugard BHT) | 0.01 |

[1] A mixture of $R-O-(CH_2CH_2O-)_nPO_3M_2$ and $[R-O-(CH_2CH_2O-)_n]_2PO_2M$ wherein "n" is a number from 1 to 40, "R" is an alkyl or alkaryl group and M is hydrogen, ammonia or an alkali metal, produced by General Aniline & Film Corp.

195 Parts of water were charged to a reactor followed by the addition of 1.35 parts GAFAC RE-610. An additional 20 parts of water was utilized to rinse the GAFAC RE-610 into the reactor.

The reactor, containing the emulsifier solution, was purged with nitrogen and heated to 70°C. The precharge, consisting of 1.0 part styrene in 8.0 parts of acrylonitrile, was charged to the reactor followed by the addition of an additional 10 parts of water. After a period of 15 minutes, 0.1 parts of Vazo 64 in 0.5 part acrylonitrile was added to the reactor. An additional 0.5 parts of acrylonitrile was added to rinse the entrance port of the reactor. The remaining water (10 parts) was then added. Another 0.03 parts of Vazo 64 was added after a period of 1½ hours and 0.03 part after 3½ hours. A total of six portions of 0.5 parts of acrylonitrile, 0.5 parts as a solvent and 0.5 parts as a rinse were used each time the initiator was added.

The addition of the monomer-chain transfer solution prepared by adding 1.65 parts of Carlisle Q-43 to 66.0 parts acrylonitrile and 22.0 parts styrene was begun immediately, and pumping was conducted lineraly over a period of four hours. The reaction was continued for an additional 45 minutes and was terminated by the addition of 0.01 part Naugard BHT. The temperature was held at 70°C while the unreacted monomers were removed under a vacuum of 20 inches Hg. The total solids content of the resulting latex was 29.5%. The latex was coagulated in 1½ volumes of water, heated to 88°–90°C and containing 3 grams $Al_2(SO_4)_3 \cdot 18H_2O$ per hundred grams of resin solids.

Example B

1. Preparation of Elastomer

| Components | Parts by Weight |
| --- | --- |
| Demineralized water | 200.0 |
| Butadiene | 75.0 |
| Styrene | 25.0 |
| Sodium hydroxide (98% active) | 0.2796 |
| T-11 fatty acid | 1.846 |
| Daxad 11 (sodium salts of polymerized alkyl naphthalene sulfonic acids) | 0.1 |
| t-Dodecyl mercaptan | 0.3 |
| Potassium persulfate | 0.17 |
| Dow anti-foam (FG-10) polydimethyl siloxane | |

| Components | Parts by Weight |
| --- | --- |
| 50% solution | 0.02 |

1.846 Parts of T-11 fatty acid melt were weighed into a stainless steel container and heated to 60°–65°C. 177.6 Parts of demineralized water (50°–55°C) and 0.28 parts sodium hydroxide were added to a separate reactor and the mixture was heated to 60°C with agitation. The T-11 fatty acid melt was then added to the reactor, and the steel container was rinsed with 3.8 parts of demineralized water which was also added to the reactor. After a period of 10 minutes, the pH of the mixture was adjusted to 10.1 with dilute HCl. The resulting soap solution was cooled to 45°C, 0.1 part of Daxad-11 was added, and the reactor was sealed. A solution of 0.3 part t-dodecyl mercaptan in 25 parts styrene was drawn into the reactor by means of a vacuum, and this was followed by the addition of 15 parts demineralized water. Agitation was then discontinued, and the reactor was purged with nitrogen, leaving the reactor with a final vacuum of 20 in. Hg.

75 Parts of butadiene were charged to the reactors and the contents of the reactor were slowly heated to 60°C with stirring. When the temperature reached 60°C, a solution of 0.17 part potassium persulfate in 3.2 parts of demineralized water was added (using $N_2$ pressure), followed by the addition of a 0.4 part demineralized water. The reaction was continued for 14 hours at 60°C, during which time the solids level of the latex reached 29.3% by weight. 0.02 Part of Dow FG-10 antifoam agent was added to the reaction product with the aid of nitrogen pressure, and the reactor was slowly vented. The unreacted monomers were then removed from the reaction mixture by steam stripping for a period of 4 hours, and the latex was cooled and filtered through cheesecloth. The total solids in the final latex was 29% by weight.

2. Preparation of Acrylonitrile-Styrene Graft Copolymer (5 phr elastomer)

| Components | Parts by weight |
| --- | --- |
| Demineralized water | 250.0 |
| Acrylonitrile | 78.0 |
| Styrene | 22.0 |
| Elastomer prepared in Step 1 (29% active) | 15.2 |
| t-Butyl mercaptan | 0.55 |
| GAFAC RE-610[1] | 1.5 |
| Citric acid monohydrate | 0.2 |
| Vazo 52 (2,2'azobis(α,γ-dimethyl valeronitrile) | 0.16 |

[1] A mixture of $R-O-(CH_2CH_2O-)_nPO_3M_2$ and $[R-O-(CH_2CH_2O-)_n]_2PO_2M$ wherein "n" is a number from 1 to 40, "R" is an alkyl or alkaryl group and M is hydrogen, ammonia or an alkali metal, produced by General Aniline & film Corp.

168.7 Parts of demineralized water were added to a reactor. The reactor was sealed and purged with nitrogen. To a separate container were added 26.9 parts of demineralized water, 1.5 parts GAFAC RE-610 and 0.02 part citric acid monohydrate, and the components were mixed until dispersed. To a third container were added 21.6 parts styrene and 67 parts acrylonitrile and the components were mixed for 10 minutes. The aqueous solution of GAFAC RE-610 and citric acid were then added to the reactor by vacuum and the contents of the reactor heated with agitation. 15.2 Parts of elastomer were then added by vacuum followed by 20.3 parts demineralized rinse water. While heating, the reactor was purged with nitrogen. A mixture of monomer precharge consisting of 0.4 part styrene and 8.43 parts of acrylonitrile were added to the reactor by vacuum, and this was followed by the addition of 20.3 parts of demineralized water. The nitrogen purge was again repeated, and the final pressure in the reactor was maintained at a vacuum of 10 inches of Hg. After the temperature of the reactor was stabilized at 60°C, 0.1 part of Vazo 52 dissolved in 1.0 part acrylonitrile was added to the reactor with vacuum, followed by 0.33 part acrylonitrile as a rinse. 0.75 Part of water was then used to rinse the acrylonitrile into the reactor, and reaction time was measured subsequent to this point. After fifteen minutes of reaction time, the balance of the monomer mixture and the t-butyl mercaptan were pumped into the reactor through separate lines over a period of 360 minutes. At 165 minutes of reaction time, 0.3 parts of Vazo 52 dissolved in 0.33 parts of acrylonitrile were added to the reaction mixture by means of a vacuum, and this was followed by 0.33 parts of acrylonitrile and 0.75 parts of water. At 285 minutes of reaction time, the above addition of Vazo 52 and acrylonitrile was repeated, and the temperature was then raised to 65°C after 315 minutes. After all the monomers and the mercaptan had been added, the lines were purged with 0.75 part demineralized water and the temperature was maintained at 65°C for an additional 30 minutes.

The resulting latex was vacuum stripped at 65°C for 4 hours to remove unreacted volatile starting materials, and the total solids content of the latex was 26.5% The latex was coagulated in 1½ volumes of an aqueous solution of $Al_2(SO_4)_3 \cdot 18H_2O$ which had been heated to 88°–90°C. The solution contained 3 grams of the aluminum salt per hundred grams of resin solids The resin solids were separated by filtration, washed with water equal in volume to that of the original emulsion, and then dried in a forced air oven at 77°C.

Example C

Acrylonitrile-Styrene Graft Copolymer (15 phr elastomer)

| Components | Parts by weight |
| --- | --- |
| Demineralized water | 250.0 |
| Acrylonitrile | 80.0 |
| Styrene | 20.0 |
| GAFAC RE-610 | 1.75 |
| Emulsifier (Igepal CO-430) | 0.25 |
| t-Butyl mercaptan | 0.82 |
| Elastomer (prepared as in Step 1 of Example B, 29% active) | 51.8 |
| Vazo 52 | 0.16 |

146.3 Parts of demineralized water were added to a reactor. To 26.6 parts demineralized water in a separate container were added 1.75 parts GAFAC RE-610 and 0.25 parts Igepal CO-430. To still another container were added 19.6 parts styrene and 69.4 parts acrylonitrile. The reactor was sealed and purged with nitrogen, and the aqueous solution of GAFAC RE-610 and Igepal CO-430 were added by means of a partial vacuum. The contents of the reactor were mixed and heating was begun. 51.8 Parts of elastomer were then added to the reactor by means of a vacuum, and 19.95 parts demineralized water was used to rinse the elastomer and emulsifier containers was subsequently added to the reactor. While heating, the reactor was purged with nitrogen.

A precharge of monomers consisting of 0.4 parts styrene in 8.6 parts acrylonitrile was added to the reactor by means of vacuum, and this was followed by the addition of 19.95 parts of demineralized water. The nitrogen purge was repeated while maintaining a vacuum of 10 inches of Hg. in the reactor. When the temperature of the reactor and its contents was stabilized at 60°C, 0.1 part of Vazo 52 dissolved in 0.5 part acrylonitrile, followed by 0.5 part acrylonitrile rinse were drawn into the reactor by vacuum. Reaction time was initiated at this point. After 25 minutes of reaction time, the balance of the monomer mixture and the t-butyl mercaptan were pumped into the reactor through separate lines. The addition time continued over a period of 360 minutes. At 175 minutes of reaction time, 0.93 parts of Vazo 52 dissolved in 0.25 parts of acrylonitrile was drawn into the reactor by vacuum. This was followed by the addition of 0.25 part acrylonitrile. At 295 minutes of reaction time, the addition of the Vazo 52 in acrylonitrile was repeated, but in this instance the acrylonitrile rinse was followed by the addition of a 0.4 part water wash. The reaction temperature was maintained at 60°C for an additional 30 minutes following the completion of the monomer feed.

The resulting latex was vacuum stripped at 65°C for 4 hours to remove unreacted volatile starting materials, and the total solids content of the latex was 26.8%. The latex was coagulated in 1½ volumes of an aqueous solution of $Al_2(SO_4)_3 \cdot 18H_2O$ which had been heated to 88°–90°C. The solution contained 3 grams of the aluminum salt per hundred grams of resin solids. The resin solids were then separated by filtration, washed with water in amounts equal to the volume of the original emulsion, and dried in a forced air oven at 77°C.

The various stabilizing agents of this invention were added to the dried powders of the polymers of Examples A through C in the amounts of 0.5 parts by weight per hundred parts of resin, as indicated in Table I to III.

Example D

1. Preparation of Elastomer

| Components | Parts by weight |
| --- | --- |
| Butadiene | 75 |
| Styrene | 25 |
| Water | 200 |
| Emulsifier (soap flakes) | 2 |
| Potassium persulfate | 0.17 |
| t-Dodecyl mercaptan | 0.7 |

All of the reactants with the exception of the butadiene were charged to a 75 gallon reactor, and the reaction was purged with nitrogen. The butadiene was then added, and heating and agitation was begun. The temperature was raised to 60°C, and the reaction was continued at this temperature for 14 hours. After the conversion level reached 85%, the reactor was cooled and vented to remove the unreacted butadiene.

2. Preparation of Acrylonitrile-Styrene Graft Copolymer

| Components | Parts by weight |
| --- | --- |
| Initial charge: | |
| Acrylonitrile | 9.8 |
| Styrene | 0.2 |
| Elastomer (prepared in step 1) | 5.0 |

| Components | Parts by weight |
|---|---|
| Water | 250 |
| GAFAC RE-610 | 2.0 |
| Citric acid | 0.10 |
| Azobisisobutyronitrile | 0.10 |
| Vazo 52 | 0.10 |
| Continuous Monomer Feed: | |
| Acrylonitrile | 67.5 |
| Styrene | 22.5 |
| Limonene dimercaptan | 0.6 |
| 7-oxabicyclo[2.2.1]5-heptene-2,3-dicarboxylic anhydride | 0.5 |

The polymerization was carried out in a 3000-ml. glass flask, and temperature control was maintained by means of a constant temperature water bath. All of the initial charge, with the exception of the catalyst ALBN and Vazo 52, were mixed in a 200-ml. beaker and then poured into the flask. Agitation was begun and the catalyst was added when the contents of the flask came to within 1°–2°C of the desired reaction temperature of 65°C. The remaining monomers were pumped into the reaction mixture at a rate of 1 cc/min. This rate of monomer feed was continued for one hour and then increased to 2.3 cc/min. until all of the remaining monomer was added. The latex was then filtered through cheesecloth, cooled, and coagulated in 150-gram dry resin aliquots in 2500 ml. of water at 80° to 90°C containing 2.5 grams of aluminum sulfate. The coagulant was then filtered, air dried overnight and subsequently vacuum dried overnight at 45° to 50°C.

EXAMPLE E

The method of preparation of the polymer in Example D was repeated with the exception that the polymer contained 2.5 parts by weight of elastomer, no citric acid, and the stabilizer, 7-oxabicyclo[2.2.1]5-heptene-2,3-dicarboxylic anhydride, was dissolved in a small amount of acrylonitrile and added to the latex of the polymer before coagulation.

EXAMPLE F

1. Preparation of the Elastomer

| Components | Parts by weight |
|---|---|
| Distilled water | 200.0 |
| Butadiene | 70.0 |
| Acrylonitrile | 30.0 |
| Vazo 64 | 0.40 |
| t-Dodecylmercaptan | 0.65 |
| S. F. flakes | 1.40 |
| Daxad-11 | 0.10 |

All of the above reactants were added to the reactor with the exception of the butadiene. The reactor was then sealed and purged with nitrogen. A vacuum was applied to the reactor and the butadiene drawn in. The reactor was then heated 50°C with stirring and the contents allowed to react for 19.5 hours. At the end of that time, the reactor was cooled and vented. The final pH of the latex was 8.9 and the total solids was 32%.

2. Preparation of the Acrylonitrile-Methyl Acrylate Graft Copolymer

| Components | Parts by weight |
|---|---|
| Water (distilled) | 230.0 |
| Acrylonitrile | 75.0 |
| Methyl acrylate | 25.0 |
| Potassium persulfate | 0.06 |
| Carlisle Q-43 | 1.55 |
| Polyvinyl pyrrolidone (PVP K-90) | 0.30 |
| Sodium dioctyl sulfosuccinate (MONOWET MO-70R) | 1.21 |
| Elastomer (prepared in Step 1) | 28.12 (9 parts solids) |

The sodium dioctyl sulfocuccinate and the polyvinyl pyrrolidone were dissolved in the distilled water and the solution added to the reactor. The elastomer was then added with mixing, followed by the addition of the two monomers. The reactor was then sealed and flushed with nitrogen. Heating was initiated, and at 57°C the initiator (potassium persulfate) was added and the pumping of the Q-43 was begun. The Q-43 was added for the first 75 minutes after initiation. Completion of the reaction was determined when the total solids reached 28% and the conversion level reached 85%. The latex was coagulated in aqueous aluminum sulfate [3g $Al_2(SO_4)_3 \cdot 18H_2O$ per 100 g resin solids], filtered, and dried under vacuum.

The resin compositions obtained from the preparation of Examples A through F were then evaluated for their color stability and optical properties by a method based on the use of a Brabender Plasticorder. The method was designed to enable the prediction of the optical properties such as haze, color, and light transmission resulting from processing various resin batches into fabricated articles. It was found that five to seven minute residence time in the Brabender at 210°C is equivalent to the total heat history that the resin would encounter during processing.

The instrument used consisted of a dynamometer, Type PL-U33AA (No. 2162-64), and its accompanying roller style measuring head (No. A-30/2.B.). The roller style measuring head was electrically heated and was equipped with a Rosemont temperature controller. Fifty-gram samples were screened in the Brabender set for a temperature of 210°C and 35 rpm. Four samples, approximately 1.5 g in weight were removed at three-minute intervals from the Brabender for optical measurements. The initial sample was taken four minutes after the start of sample loading. Torque values and temperature were also noted at the four-minute mark. Discs having a uniform thickness of 40 mils were prepared for optical measurements by pressing the fused polymer under mild conditions. The conditions selected for the pressing of discs from Brabendered samples did not contribute significantly to measured optical values. The disc was prepared by placing a mold 40 mils thick and 1¼ inches diameter in a press between two parallel mirror-finished, chrome-plated brass platens, one-eighth inch thick. The platens were heated to 154°C. A 1.5-g sample of the cooled resin removed at the various times from the Brabender was placed in each of the four cavities of the mold or in two cavities diagonally across from one another if only two discs were being processed. The heated plates containing the resin and the mold therebetween were positioned in the press so that the melt samples were pressed between the two highly polished surfaces. Fifteen thousand pounds ram pressure was applied and held for 5 to 10 seconds. The pressure was then released and the entire unit transferred to a cold press where 20,000 lbs. ram pressure was applied. After approximately 30 seconds the plates were sufficiently cool to handle. The unit was then removed and the discs were removed from the cavities. The percent light transmission was measured with the Hunterlab Colormeter and the Yellowness Index and percent haze were determined by ASTM Standard Methods D 1925- 70 and D 1003-61, respectively.

The effect of the various stabilizing agents on the color stability and the clarity of the various polymer compositions prepared in Examples A through F are shown by the yellowness index and percent haze measurements summarized in Tables I through V. These data indicate that the polymers containing the stabilizing agents of the present invention show a marked improvement in color stability over the corresponding base resins, and they do not affect the clarity of the resins. However, the compounds outside the scope of the present invention, namely, phthalic anhydride, succinic acid and 7-oxabicyclo-[2.2.1]-heptane-2, 3-dicarboxylic anhydride show little or no improvement in color stability when added to these same nitrile polymer compositions, and in some instances are shown to promote discoloration in these resins.

In Example D, the stabilizer was added to the reaction mixture along with the monomers during the preparation of the polymer, and in Example E to the latex of the polymer before coagulation. The data shown in Table IV indicate that these methods are also effective means for incorporating the stabilizers in these resins.

Table I

| Ex. | Stabilizer[1] | Structure | Yellowness Index | | | | % Haze | | | |
|---|---|---|---|---|---|---|---|---|---|---|
| | | | 4 min | 7 min | 10 min | 13 min | 4 min | 7 min | 10 min | 13 min |
| 1 | Base Resin (Example A) (Average of 17 runs) | | 23.9 | 59.9 | 82.4 | 94.1 | 3.0 | 3.6 | 5.4 | 6.7 |
| 2 | 7-oxabicyclo[2.2.1]5-heptene-2,3-dicarboxylic anhydride | | 13.3 | 23.3 | 31.5 | 38.1 | 3.4 | 3.2 | 6.7 | 9.6 |
| 3 | 7-oxabicyclo[2.2.1]5-heptene-2,3-dicarboxylic acid | | 14.5 | 22.2 | 28.4 | 34.2 | 1.9 | 1.8 | 3.6 | 5.6 |
| 4 | 5-Norbornene-2,3-dicarboxylic anhydride | | 14.2 | 27.8 | 42.9 | 54.4 | 2.0 | 2.4 | 4.0 | 5.8 |
| 5 | 7-oxabicyclo[2.2.1]5-heptene-2,3-dicarboximide | | 12.7 | 28.0 | 42.3 | 52.5 | 2.2 | 2.1 | 4.1 | 6.1 |
| 6 | N-phenyl-7-oxabicyclo[2.2.1]5-heptene-2,3-dicarboximide | | 16.1 | 31.4 | 42.8 | 55.2 | 3.1 | 3.8 | 5.5 | 8.0 |
| 7 | Phthalic anhydride | | 17.0 | 50.7 | 78.2 | 92.8 | 3.4 | 3.7 | 4.5 | 5.4 |

Table I-continued

| Ex. | Stabilizer[1] | Structure | Yellowness Index 4 min | 7 min | 10 min | 13 min | % Haze 4 min | 7 min | 10 min | 13 min |
|---|---|---|---|---|---|---|---|---|---|---|
| 8 | 7-oxabicyclo[2.2.1]-heptane-2,3-dicarboxylic anhydride | (structure shown) | 17.0 | 46.1 | 72.5 | 86.7 | 3.8 | 4.4 | 5.3 | 7.0 |

[1] Stabilizer was dry blended with powdered base resin in concentrations of 0.5 phr, by weight.

Table II

| Example | Stabilizer[1] | Yellowness Index 4 min | 7 min | 10 min | 13 min | % Haze 4 min | 7 min | 10 min | 13 min |
|---|---|---|---|---|---|---|---|---|---|
| 9 | Base Resin (Example B) | 11.1 | 19.7 | 28.2 | 34.5 | 2.3 | 2.1 | 2.4 | 2.4 |
| 10 | 7-oxabicyclo[2.2.1]5-heptene-2,3-dicarboxylic anhydride | 8.8 | 10.9 | 13.0 | 14.9 | 2.4 | 2.0 | 1.9 | 1.8 |
| 11 | 5-Norbornene-2,3-dicarboxylic anhydride | 9.6 | 12.7 | 16.3 | 19.4 | 2.2 | 2.0 | 2.9 | 2.1 |
| 12 | 7-oxabicyclo-[2.2.1]5-heptene-2,3-dicarboxylic acid | 9.9 | 12.1 | 13.9 | 16.3 | 2.4 | 1.9 | 2.4 | 2.0 |
| 13 | Phthalic anhydride | 11.3 | 21.7 | 31.1 | 40.7 | 2.1 | 2.0 | 2.3 | 2.2 |
| 14 | Succinic anhydride | 12.1 | 23.6 | 35.6 | 46.1 | 2.6 | 4.1 | 3.3 | 3.7 |
| 15 | 7-oxabicyclo-[2.2.1]-heptane-2,3-dicarboxylic anhydride | 10.9 | 19.9 | 29.7 | 37.3 | 2.2 | 2.1 | 2.2 | 2.1 |

[1] Stabilizer was dry blended with powdered resin in concentrations of 0.5 phr by weight.

Table III

| Example | Stabilizer[1] | Yellowness Index 4 min | 7 min | 10 min | 13 min | % Haze 4 min | 7 min | 10 min | 13 min |
|---|---|---|---|---|---|---|---|---|---|
| 16 | Base Resin (Example C) | 20.1 | 36.2 | 44.4 | 53.7 | 1.9 | 2.3 | 2.2 | 2.4 |
| 17 | 7-oxabicyclo[2.2.1]5-heptene-2,3-dicarboxylic anhydride | 9.5 | 13.1 | 15.3 | 18.3 | 2.0 | 2.1 | 3.5 | 2.6 |
| 18 | 5-Norbornene-2,3-dicarboxylic anhydride | 12.2 | 17.6 | 22.7 | 27.5 | 2.5 | 3.9 | 3.8 | 3.4 |
| 19 | 7-oxabicyclo[2.2.1]5-heptene-2,3-dicarboxylic acid | 12.8 | 16.8 | 19.9 | 23.5 | 2.5 | 3.3 | 5.1 | 3.2 |
| 20 | Phthalic anhydride | 17.0 | 35.9 | 47.2 | 58.3 | 3.6 | 4.8 | 5.2 | 4.9 |
| 21 | Succinic anhydride | 27.2 | 47.7 | 60.3 | 68.2 | 3.0 | 2.9 | 3.4 | 3.1 |
| 22 | 7-oxabicyclo[2.2.1]-heptane-2,3-dicarboxylic anhydride | 15.3 | 29.0 | 40.0 | 47.7 | 2.7 | 3.2 | 4.0 | 2.9 |

[1] Stabilizer was dry blended with powdered resin in concentrations of 0.5 phr, by weight.

Table IV

| Example | Resin | Yellowness Index 4 min | 7 min | 10 min | 13 min | % Haze 4 min | 7 min | 10 min | 3 min |
|---|---|---|---|---|---|---|---|---|---|
| 23 | Base Resin of Example (E) (No Stabilizer) | 21.3 | 34.0 | 53.7 | 73.7 | — | — | — | — |
| 24 | Example (D) Cont'g 0.5 phm 7-oxabicyclo[2.2.1]5-heptene-2,3-dicarboxylic anhydride | 18.2 | 29.5 | 45.5 | 59.0 | 6.2 | 4.1 | 5.3 | 4.8 |
| 25 | Example (E) Cont'g 0.5 phm 7-oxabicyclo[2.2.1]5-heptene-2,3-dicarboxylic anhydride | 11.0 | 15.1 | 22.5 | 32.0 | 9.9 | 7.4 | 6.3 | 6.3 |

Table V

| Example | Stabilizer[1] | Yellowness Index 4 min | 7 min | 10 min | 13 min | % Haze 4 min | 7 min | 10 min | 13 min |
|---|---|---|---|---|---|---|---|---|---|
| 26 | Base Resin of Example F | 29.8 | 41.7 | 49.1 | 56.8 | 4.4 | 4.2 | 5.0 | 5.0 |
| 27 | 7-oxabicyclo[2.2.1]5-heptene-dicarboxylic anhydride | 27.6 | 34.4 | 41.8 | 48.8 | 4.9 | 5.4 | 4.2 | 4.9 |
| 28 | 7-oxabicyclo[2.2.1]heptane-2,3-dicarboxylic anhydride | 36.2 | 45.0 | 53.0 | 57.1 | 4.9 | 4.3 | 3.7 | 4.3 |
| 29 | Succinic Anhydride | 34.3 | 43.6 | 51.2 | 58.6 | 2.9 | 3.8 | 3.2 | 4.3 |

[1] Stabilizer dry blended with the powdered base resin in concentrations of 0.5 phr, by weight.

We claim:

1. A polymer composition stable toward thermal discoloration containing from about 0.05 to 2.0 parts by weight per hundred parts of resin of an organic stabilizing agent selected from the group consisting of:

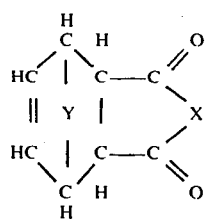

and

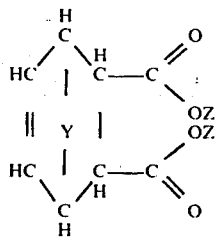

wherein X may be oxygen; and imide group, -NH-; or an N-substituted imide group, —NR—, wherein R may be an alkyl, or a phenyl alkyl group containing from 1 to 8 carbon atoms; Y may be an oxygen or a methylene group; and Z may be hydrogen or an alkyl group containing from 1 to 12 carbon atoms; and where said resin is composed of 100 parts by weight of:
  A. at least 50% by weight of at least one nitrile having the structure

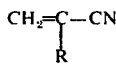

wherein R is hydrogen, a lower alkyl group having from 1 to 4 carbon atoms, or a halogen, and
  B. up to 50% by weight based on the combined weight of (A) and (B) of at least one member selected from the group consisting of:
    1. styrene,
    2. an ester having the structure

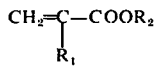

wherein $R_1$ is hydrogen, an alkyl group having from 1 to 4 carbon atoms, or a halogen, and $R_2$ is an alkyl group having from 1 to 6 carbon atoms,
    3. an alpha-olefin having the structure

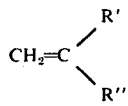

wherein R' and R'' are alkyl group having from 1 to 7 carbon atoms,
    4. a vinyl ether selected from the group consisting of methyl vinyl ether, ethyl vinyl ether, the propyl vinyl ethers, and the butyl vinyl ethers, and
    5. vinyl acetate, and
wherein said monomers are copolymerized in the presence of from 0 to 40 parts by weight of:
  C. a rubbery polymer of a conjugated diene monomer selected from the group consisting of butadiene and isoprene and optionally a comonomer selected from the group consisting of styrene and a nitrile monomer having the structure

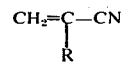

wherein R has the above designation, said rubbery polymer containing from 50 to 100% by weight of polymerized conjugated diene and from 0 to 50% by weight of comonomer.

2. The polymer composition in claim 1 wherein the stabilizing agent is 7-oxabicyclo [2.2.1]5-heptene-2, 3-dicarboxylic anhydride having the formula:

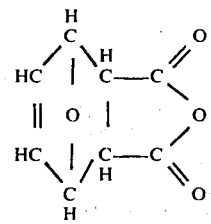

3. The polymer composition in claim 1 wherein the stabilizing agent is 7-oxabicyclo [2.2.1]5-heptene-2, 3-dicarboxylic anhydride acid having the formula:

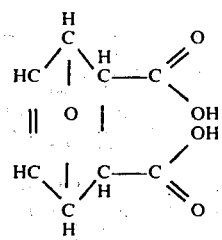

4. The polymer composition in claim 1 wherein the stabilizing compound is 5-norbornene-2,3-dicarboxylic anhydride having the formula:

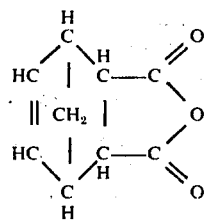

5. The polymer composition of claim 1 wherein the stabilizing agent is 7-oxabicyclo[2.2.1]5-heptene-2,3-dicarboximide having the formula:

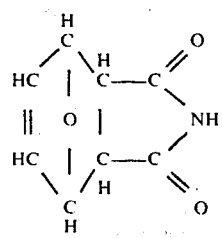

6. The polymer composition of claim 1 wherein the stabilizing agent is N-phenyl-7-oxabicyclo[2.2.1]5-heptene-2, 3-dicarboximide having the formula:

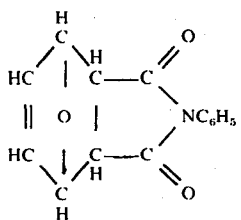

7. The polymer composition of claim 1 wherein the component (A) is present in amounts of from about 70 to 90% by weight based on the combined weight of (A) and (B); component (B) is correspondingly present in amounts of from about 30 to 10% by weight based on the combined weight of (A) and (B), and the stabilizing compound is present in concentrations of from about 0.1 to 1.0 parts by weight per hundred parts of resin.

8. The composition of claim 7 wherein the component (A) is a member selected from the group consisting of acrylonitrile and methacrylonitrile.

9. The composition of claim 8 wherein the component (B) is styrene.

10. The composition of claim 8 wherein component (B) is a member selected from the group consisting of methyl acrylate, ethyl acrylate, methyl methacrylate, and ethyl methacrylate.

11. The composition in claim 1 wherein the component (A) is acrylonitrile, component (B) is styrene and component (C) consists of a copolymer of butadiene and styrene.

* * * * *